(12) United States Patent
Saxena et al.

(10) Patent No.: US 11,416,322 B2
(45) Date of Patent: *Aug. 16, 2022

(54) REPROVISIONING VIRTUAL MACHINES BY MEANS OF DVFS-AWARE SCHEDULING

(71) Applicant: INTERNATIONAL BUSINESS MACHINES CORPORATION, Armonk, NY (US)

(72) Inventors: Rajesh Kumar Saxena, Thane East (IN); Vikram Yadav, Bangkok (IN)

(73) Assignee: International Business Machines Corporation, Armonk, NY (US)

( * ) Notice: Subject to any disclaimer, the term of this patent is extended or adjusted under 35 U.S.C. 154(b) by 703 days.

This patent is subject to a terminal disclaimer.

(21) Appl. No.: 16/409,094

(22) Filed: May 10, 2019

(65) Prior Publication Data

US 2019/0272208 A1 Sep. 5, 2019

Related U.S. Application Data

(63) Continuation of application No. 15/705,884, filed on Sep. 15, 2017, now Pat. No. 10,379,923.

(51) Int. Cl.
*G06F 11/07* (2006.01)
*G06F 9/50* (2006.01)
(Continued)

(52) U.S. Cl.
CPC .......... *G06F 11/0712* (2013.01); *G06F 9/455* (2013.01); *G06F 9/45558* (2013.01);
(Continued)

(58) Field of Classification Search
CPC .. G06F 11/0712; G06F 11/0793; G06F 11/20; G06F 11/301; G06F 11/3442;
(Continued)

(56) References Cited

U.S. PATENT DOCUMENTS 8,424,000 B2 4/2013 Vijay
8,949,415 B2 * 2/2015 Abuelsaad .......... H04L 12/1485
709/224

(Continued)

FOREIGN PATENT DOCUMENTS

CN 102394774 B 3/2014
CN 102693177 B 2/2015

OTHER PUBLICATIONS

Abawajy, Jernal H. "Fault-tolerant scheduling policy for grid computing systems" 18th International Parallel and Distributed Processing Symposium, 2004. Proceedings. IEEE, 2004.
(Continued)

*Primary Examiner* — Matthew M Kim
*Assistant Examiner* — Matthew N Putaraksa
(74) *Attorney, Agent, or Firm* — Schmeiser, Olsen & Watts; Stephanie Carusillo

(57) ABSTRACT

A method and associated systems use DVFS performance-scaling technology to satisfy quality-of-service performance requirements when recovering a job that had been scheduled to run on a failed virtual machine. A Buffer Time specifies a duration of time remaining, at the time of failure, for the job to complete in order to satisfy the quality-of-service requirements. Depending on relative durations of time required to repair the failed virtual machine, to perform the job on an unscaled active-mode virtual machine, and to transfer the job to another virtual machine, the system determines whether to repair the failed virtual machine or to transfer the job. If the latter, the system then determines whether to select a destination virtual machine provisioned on a DVFS-compliant platform and, if so, the system scales the DVFS-compliant platform's performance to a level sufficient to complete the job within the Buffer Time.

20 Claims, 4 Drawing Sheets

(51) Int. Cl.
  *G06F 9/455* (2018.01)
  *G06F 11/20* (2006.01)
  *G06F 11/30* (2006.01)
  *G06F 11/34* (2006.01)
  *G06F 9/48* (2006.01)

(52) U.S. Cl.
  CPC .............. *G06F 9/4856* (2013.01); *G06F 9/50* (2013.01); *G06F 11/0793* (2013.01); *G06F 11/20* (2013.01); *G06F 11/301* (2013.01); *G06F 11/3442* (2013.01)

(58) Field of Classification Search
  CPC .... G06F 9/455; G06F 9/45558; G06F 9/4856; G06F 9/50
  See application file for complete search history.

(56) References Cited

U.S. PATENT DOCUMENTS

| | | | |
|---|---|---|---|
| 9,069,730 | B2 | 6/2015 | Talwar et al. |
| 9,116,181 | B2 * | 8/2015 | Yu .......................... G06F 9/5094 |
| 10,514,989 | B1 * | 12/2019 | Borodin .............. G06F 11/1464 |
| 2009/0132840 | A1 | 5/2009 | Talwar ................ G06F 9/45558 |
| | | | 713/340 |
| 2012/0239952 | A1 * | 9/2012 | Nishiguchi ............. G06F 1/324 |
| | | | 713/320 |
| 2012/0290865 | A1 * | 11/2012 | Kansal .................... G06F 1/329 |
| | | | 713/340 |
| 2013/0111470 | A1 | 5/2013 | Bozek |
| 2015/0046923 | A1 * | 2/2015 | Kruglick ................... G06F 1/26 |
| | | | 718/1 |
| 2015/0067143 | A1 | 3/2015 | Babakhan |
| 2016/0036655 | A1 | 2/2016 | Burton et al. |
| 2016/0048438 | A1 | 2/2016 | Martos |
| 2017/0091010 | A1 * | 3/2017 | Takahashi ................ G06F 9/50 |
| 2017/0199564 | A1 * | 7/2017 | Saxena ................ G06F 1/3296 |
| 2018/0276019 | A1 | 9/2018 | Ali |
| 2018/0276038 | A1 * | 9/2018 | Malik .................... G06F 9/5077 |
| 2018/0341555 | A1 * | 11/2018 | Tsao .................... G06F 11/2038 |
| 2019/0087259 | A1 * | 3/2019 | Saxena ............... G06F 11/0712 |
| 2019/0384682 | A1 * | 12/2019 | Kondo ................ G06F 11/1471 |
| 2021/0406832 | A1 * | 12/2021 | Tennur Narayanan ...................... G06Q 10/0633 |

OTHER PUBLICATIONS

Labriola, Donald J.; List of IBM Patents or Patent Applications Treated as Related; May 8, 2019; 1 page.

Le Sueur et al., Dynamic Voltage and Frequency Scaling: The Laws of Diminishing Returns, Oct. 2010, ResearchGate, 6 pages.

Sulaiman et al., Dynamic Voltage Frequency Scaling (DVFS) For Microprocessors Power and Energy Reduction ResearchGate; Dec. 2015; 6 pages.

Von Laszewski, Gregor, et al. "Power-aware scheduling of virtual machines in dvfs-enabled clusters." 2009 IEEE International Conference on Cluster Computing and Workshops. IEEE, 2009.

Zheng, Junjun, Hiroyuki Okamura, and Tadashi Dohi. "Availability importance measures for virtualized system with live migration." Applied Mathematics 6.02 (2015): 359.

Xia, YunNi et al.; A Stochastic Approach to Analysis of Energy-Aware DVS-Enabled Cloud Datacenters; IEEE Transactions on Systems, Man, and Cybernetics: Systems, vol. 45, No. 1; Jan. 2015; pp. 73-83.

Zhang, Fan et al.; Evolutionary Scheduling of Dynamic Multitasking Workloads for Big-Data Analytics in Elastic Cloud; IEEE Transaction on Emerging Topics in Computing, vol. 2, No. 3; Sep. 2014; pp. 338-351.

Mondal, Subrota K. et al.; Computing Defects per Million in Cloud Caused by Virtual Machine Failures with Replication; 2014 IEEE20th Pacific Rim International Symposium on Dependable Computer; Nov. 18-21, 2014; 3 pages.

Zheng, Zeyu et al.; Least Maintenance Batch Scheduling i Cloud Data Center Networks; IEEE Communications Letters, vol. 18, Issue 6; Jun. 2014; 3 pages.

Roy, Arpan et al.; Reducing service failures by failure and workload aware load balancing in SaaS clouds; 2013 43rd Annual IEEE/IFIP conference on Dependable Systems and Networks Workshop; Jun. 24-27, 2013; 5 pages.

Machida, Fumio et al.; Modeling and analysis of software rejuvenation in a server virtualized system with live VM migration; Performance Evaluation, vol. 7, Issue 3; Mar. 2013; pp. 212-230.

Kashyap, Sanidhya et al.; RLC—A Reliable approach to Fast and Efficient Live Migration of Virtual Machines in the Clouds; 2014 IEEE International Conference on Cloud Computing; Jun. 27-Jul. 2, 2014; pp. 360-367.

* cited by examiner

REPROVISIONING VIRTUAL MACHINES BY MEANS OF DVFS-AWARE SCHEDULING

CROSS REFERENCE TO RELATED APPLICATIONS

This application is a continuation application claiming priority to Ser. No. 15/705,884 filed Sep. 15, 2017, now U.S. Pat. No. 10,379,923, issued Aug. 13, 2019, the contents of which are hereby incorporated by reference.

BACKGROUND

The present invention relates generally to efficiently managing jobs that fail in a virtualized computing environment. In particular, the invention relates to determining whether a job should be restarted on the same active-mode virtual machine or on a different active-mode or DVFS-mode) Dynamic Voltage and Frequency Scaling mode) virtual machine.

Scheduling a software job to run on a virtual machine in a virtualized computing environment may comprise placing that job in a queue associated with that virtual machine. The virtual machine may, however, be unable to perform the queued job in a satisfactory way if the virtual machine subsequently suffers degraded performance or fails in some other way. When such a failure occurs, predefined "proactive scheduling" rules may determine whether to pause the job in the current queue until the virtual machine recovers or to transfer the job a queue of a different virtual machine.

Many factors may affect the efficiency of such decisions. The amount of lead time or buffer time allowed for performance of a queued job, known repair rates or failure rates of particular virtual machines, constraints imposed by quality-of-service (QoS) commitments, and other factors can affect whether conventional proactive-scheduling rules determine the most desirable response when a failure of a virtual machine threatens the timely performance of a scheduled job.

SUMMARY

An embodiment of the present invention provides failure-recovery system comprising a processor, a memory coupled to the processor, and a computer-readable hardware storage device coupled to the processor, the storage device containing program code configured to be run by the processor via the memory to implement a method for efficiently repairing virtual machines by means of DVFS-aware proactive scheduling, the method comprising:

the system receiving notice that a job has failed due to a failure of a failed virtual machine provisioned on a first active-mode physical platform configured to run in active mode, where the failed job resides in a queue of jobs that had been scheduled to be performed by the failed virtual machine;

the system initially identifying:

a Buffer Time B(t) that specifies a duration of time available for completing performance of the job, a Repair Time R(t) that specifies an estimated duration of time required to repair the failed virtual machine, an Active-Mode Running Time E(x) that specifies an estimated duration of time required to perform the failed job by an active-mode virtual machine provisioned on the first active-mode physical platform, and a Transition Time X(t) that specifies an estimated duration of time required to transfer the failed job to a queue of a functioning virtual machine that is distinct from the failed virtual machine;

the system determining whether the Buffer Time is less than the Repair Time;

the system attempting to reassign the failed job to a queue of the functioning virtual machine if the Buffer Time is less than the Repair time; and the system attempting to repair the failed virtual machine if the Buffer Time is not less than the Repair time.

Another embodiment of the present invention provides a method for efficiently repairing virtual machines by means of DVFS-aware proactive scheduling, the method comprising:

receiving notice that a job has failed due to a failure of a failed virtual machine provisioned on a first active-mode physical platform configured to run in active mode, where the failed job resides in a queue of jobs that had been scheduled to be performed by the failed virtual machine;

initially identifying:

a Buffer Time B(t) that specifies a duration of time available for completing performance of the job, a Repair Time R(t) that specifies an estimated duration of time required to repair the failed virtual machine, an Active-Mode Running Time E(x) that specifies an estimated duration of time required to perform the failed job by an active-mode virtual machine provisioned on the first active-mode physical platform, and a Transition Time X(t) that specifies an estimated duration of time required to transfer the failed job to a queue of a functioning virtual machine that is distinct from the failed virtual machine;

determining whether the Buffer Time is less than the Repair Time;

attempting to reassign the failed job to a queue of the functioning virtual machine if the Buffer Time is less than the Repair time; and attempting to repair the failed virtual machine if the Buffer Time is not less than the Repair time.

Yet another embodiment of the present invention provides a computer program product, comprising a computer-readable hardware storage device having a computer-readable program code stored therein, the program code configured to be executed by a failure-recovery system comprising a processor, a memory coupled to the processor, and a computer-readable hardware storage device coupled to the processor, the storage device containing program code configured to be run by the processor via the memory to implement a method for efficiently repairing virtual machines by means of DVFS-aware proactive scheduling, the method comprising:

the system receiving notice that a job has failed due to a failure of a failed virtual machine provisioned on a first active-mode physical platform configured to run in active mode, where the failed job resides in a queue of jobs that had been scheduled to be performed by the failed virtual machine;

the system initially identifying:

a Buffer Time B(t) that specifies a duration of time available for completing performance of the job, a Repair Time R(t) that specifies an estimated duration of time required to repair the failed virtual machine, an Active-Mode Running Time E(x) that specifies an estimated duration of time required to perform the failed job by an active-mode virtual machine provisioned on the first active-mode physical platform, and a Transition Time X(t) that specifies an estimated duration of time required to transfer the failed job to a queue of a functioning virtual machine that is distinct from the failed virtual machine;

the system determining whether the Buffer Time is less than the Repair Time;

the system attempting to reassign the failed job to a queue of the functioning virtual machine if the Buffer Time is less than the Repair time; and the system attempting to repair the failed virtual machine if the Buffer Time is not less than the Repair time.

DETAILED DESCRIPTION

Figure 1:
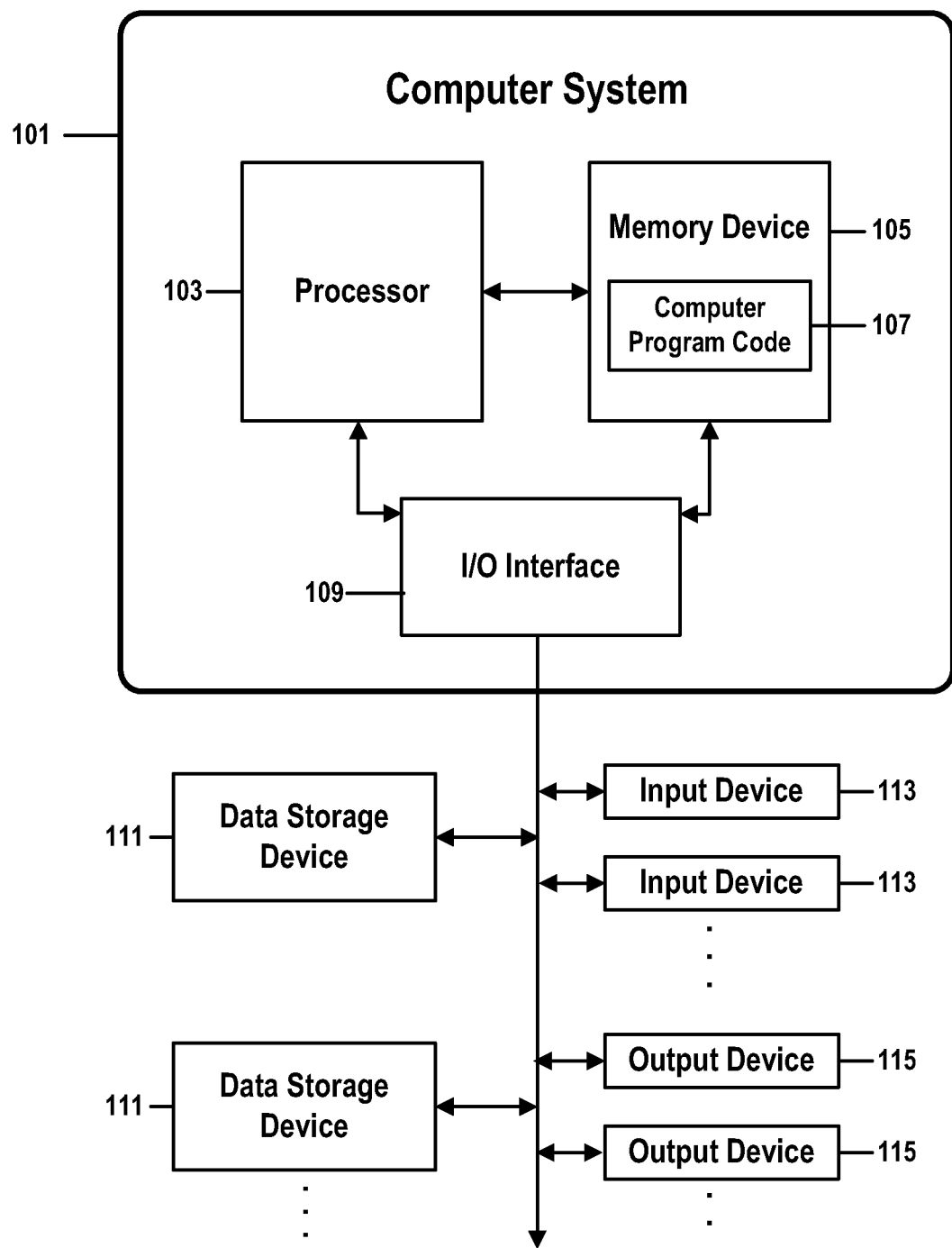
FIG. 1 shows the structure of a computer system and computer program code that may be used to implement a method for efficiently repairing virtual machines by means of DVFS-aware proactive scheduling in accordance with embodiments of the present invention.

When a virtual machine (VM) running in a virtualized computing environment degrades in performance or fails in some other way, a decision must be made about how to manage tasks or jobs that had been queued up to be performed by the failed virtual machine. A "proactive scheduling" mechanism may decide whether to retain each job in its current queue until the machine may be repaired, or to transfer one or more jobs to another, functioning, VM.

In some cases, these decisions may be made for all jobs scheduled to be performed by a particular VM upon detection that the VM has failed. In other cases, however, such a decision may not be made about a particular queued job until it has been determined that the job itself has failed.

Proactive scheduling methods known in the art may make these decisions by means of predefined rules, but these rules are generally simple error-recovery guidelines incapable of accounting for nuanced factors like known failure rates, repair rates, job-transfer times, or quality-of-service (QoS) performance requirements.

Embodiments of the present invention account reach a more sophisticated rescheduling framework capable of considering these and other factors when determining whether to pause or transfer a failed job. Furthermore, such embodiments may increase efficiency and effectiveness of such decisions by optionally transferring failed jobs to platforms that use techniques of Dynamic Voltage and Frequency Scaling (DVFS) that allow virtual machines to run more efficiently or more cost-effectively.

DVFS is a known method of balancing energy consumption and performance of a hardware computing device, such as a server capable of hosting virtual machines in a virtualized computing environment. DVFS-compliant servers may be run in "undervolted" or "overvolted" modes in which a server, respectively, either consumes less power and operates more slowly or offers higher performance at the cost of increased power consumption. This technology allows a DVFS server to be tuned to various performance levels, in addition to default maximum "active," minimum "inactive," hibernation, or sleep modes.

DVFS thus allows certain embodiments of the present invention to more efficiently accommodate workloads, especially in the event of VM failures that require rebalancing workloads, without compromising QoS. Known proactive-scheduling methodologies may attempt to ensure performance in line with QoS requirements by simply switching servers to an "active" mode for long durations of time. Such an approach may result in a data center being provisioned for peak loads, resulting in underutilization during less-active periods.

This technical problem is rooted in computerized job-scheduling technologies and, in particular, arises in proactive-scheduling methodologies that attempt to automatically handle failures in a virtualized computing environment.

Embodiments of the present invention provide a technical solution to this technical problem by automatically adjusting the number of servers to best accommodate current workloads, even when a server failure or a VM failure creates a need for workload rebalancing.

These embodiments further improve rescheduling efficiency by determining when it is advantageous to dynamically transfer failed jobs to a queue of a virtual machine provisioned on a DVFS-compliant server. DVFS technology, as is known in the art, allows voltages and frequencies of a DVFS-compliant computer's processor, buses, and other components to be scaled in order to vary the computer's level of performance. This document will refer to non-compliant computers, servers, and other platforms that run at a single unscaled level of performance to be running in "active mode" (distinguishable from, for example, a Sleep Mode or a Hibernation Mode). Embodiments of the present invention scale a DVFS-compliant computer's performance to run a queued jobs with greater or less performance and with greater or less power consumption than would a non-DVFS device capable of only a single, unscaled, active mode of operation.

These embodiments also provide benefits by further considering quality-of-service requirements when responding to a failure. Such considerations may allow an embodiment to minimize the likelihood that a failure results in an inability to comply with QoS commitments.

For all these reasons, embodiments provide a technical solution to provisioning, utilization, and efficiency problems, which necessarily arise from virtualized-computing technology and are not be addressed by known methods proactive scheduling. Such solutions enable methods of responding to a failure that minimize transition costs and power consumption, maximize server utilization, and reduce the risk of violating contractual QoS obligations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement a method for efficiently repairing virtual machines by means of DVFS-aware proactive scheduling in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for efficiently repairing virtual machines by means of DVFS-aware proactive scheduling in accordance with embodiments of the present invention, and may implement other embodiments described in this specification, including the methods illustrated in FIGS. 1-4. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for efficiently repairing virtual machines by means of DVFS-aware proactive scheduling.

Any of the components of the present invention could be created, integrated, hosted, maintained, deployed, managed, serviced, supported, etc. by a service provider who offers to facilitate a method for efficiently repairing virtual machines by means of DVFS-aware proactive scheduling. Thus the present invention discloses a process for deploying or integrating computing infrastructure, comprising integrating computer-readable code into the computer system 101, wherein the code in combination with the computer system 101 is capable of performing a method for efficiently repairing virtual machines by means of DVFS-aware proactive scheduling.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for efficiently repairing virtual machines by means of DVFS-aware proactive scheduling may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for efficiently repairing virtual machines by means of DVFS-aware proactive scheduling is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
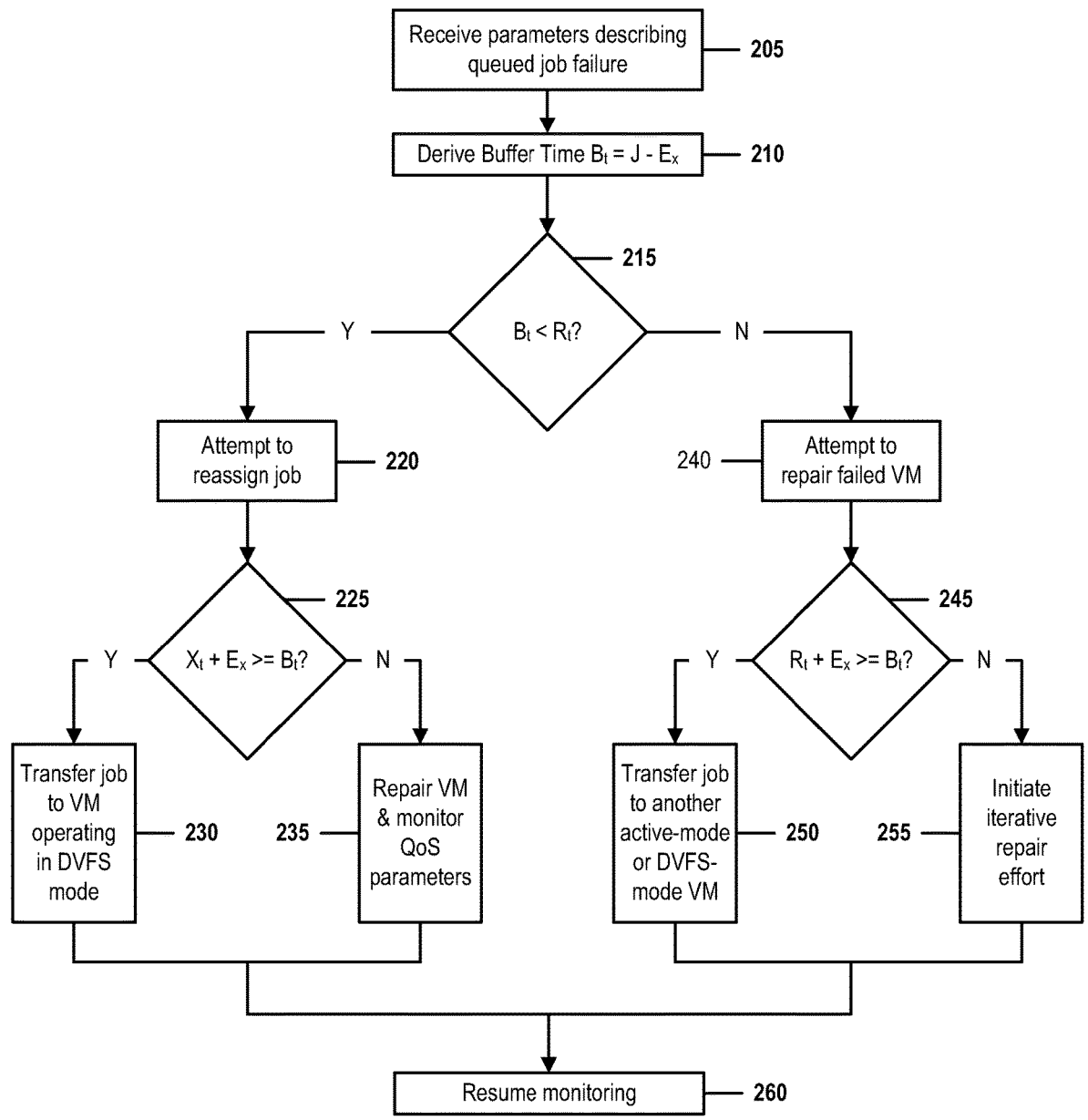
FIG. 2 is a flow chart that illustrates steps of a method for efficiently repairing virtual machines by means of DVFS-aware proactive scheduling in accordance with embodiments of the present invention.

FIG. 2 is a flow chart that illustrates steps of a method for efficiently repairing virtual machines by means of DVFS-aware proactive scheduling in accordance with embodiments of the present invention. FIG. 2 comprises step 205-260.

The method of FIG. 2 may be used by embodiments of the present invention to manage a queued job in response to a detected failure of a virtual machine, a network node, or another entity in a virtualized computing environment that is necessary to perform the queued job. This method may be performed repeatedly, once for each failed job in the queue associated with the failed VM or other entity. In certain embodiments the system may determine that a VM (or other entity) has failed by continuously monitoring such entities or the job queues associated with those VMs. In other embodiments, the scheduling system may determine that a VM has failed by receiving notice from another component of the scheduling system, of a cloud-management stack, of a network-management utility, or of another entity associated with the virtualized computing environment.

In step 205, a processor of a scheduling system tasked with managing resources in a virtualized computing environment receives or otherwise identifies parameters needed to manage virtual machines and jobs running on those virtual machines within the virtualized environment. These parameters may be received or identified by any means known in the art, such as sent through a computer network from a network-management utility, manually entered by a system administrator, or received from the virtualization layer of a cloud-management stack.

These parameters may vary from embodiment to embodiment, depending on details of the implementation that would be known to an implementer or administrator. In some embodiments, these rates may be initially estimated or chosen arbitrarily, and then refined to more closely represent accurate values as actual performance figures are collected over time. All embodiments, should, however, include:

Repair Time $R_t$: the expected duration of time necessary to repair a failed VM in order to return the VM to its normal, active mode of operation. A Repair Time for a particular type of job may be estimated in a straightforward manner by averaging previous Repair Times for similar jobs;

Active Mode Running Time $E_x$: the expected duration of time needed for the failed job to be completed by an "active-mode" virtual machine provisioned on a server or other platform running at normal speed in conventional unscaled active-mode operation. For example, if the failed job consists of a database backup, Ex for that job might specify an expected duration of time required to perform that backup on a virtual machine provisioned on a server running in unscaled active mode;

Transition Time $X_t$: the expected duration of time necessary to transfer the failed job from a queue of the failed VM to a queue associated with a functioning VM capable of performing the job;

Sojourn Time J: the duration of time allocated to the failed job while the job is in the system, from the time that the job first enters a queue through the time that the job has been completely performed. When a job is to be transferred to a different queue due to a VM failure, the Sojourn Time must be sufficient to incorporate the Transition Time $X_t$ required to transfer the job.

any Quality-of-Service requirements mandated by a Service-Level Agreement (SLA) or other contractual commitment or company-mandated performance requirements. Such requirements may, for example, include a requirement to maintain a minimum level of Quality of Service (QoS) which may be represented as a function of a system's average response time, queue length, duration of time required to perform or to launch certain tasks, jobs, or applications, media-playback performance, or average data-retrieval time. In certain embodiments and examples described in this document, these requirements may be represented as commitments to service a job in less than a predetermined maximum amount of time SLA. In particular, a failed job that is not completed within its Sojourn Time may violate a performance requirement of a Quality-of-Service requirement.

In step 210, the system derives a safety factor or Buffer time $B_t$. This is an amount of lead time allowed by the scheduling system for a particular job to be performed on its current VM, where:

$$B_t = J - E_x$$

That is, a job's Buffer Time may be computed as the job's allocated Sojourn Time (the total duration of time of time that a job may spend in the system after being added to a VM queue) less the job's Active Mode Running Time Ex (the duration of time required for an active-mode VM to perform the job). $B_t$ thus represents the maximum amount of time available to completely perform the job, should a failure force the job to be transferred to another queue.

In step 215, the system determines whether there is sufficient remaining Buffer Time $B_t$ to allow the failed VM to be repaired, where repairing the VM requires Repair Time $R_t$.

If the VM cannot be repaired within the remaining allotted Buffer Time, then the system performs steps 220-235, which attempt to transfer the failed job to a different VM. If the Buffer Time is theoretically sufficient to accommodate a repair effort, then the system attempts to repair the failed VM by means of steps 240-255 and the methods of FIGS. 3 and 4.

In step 220, after determining in step 215 that there is insufficient buffer time to attempt to repair the failed VM, the system determines that the failed job should be transferred from its current queue, which is associated with the failed VM, to a correctly functioning queue of another VM.

In step 225, the system, having determined in step 215 that the remaining Buffer Time $B_t$ is insufficient to accommodate the duration of Repair Time $R_t$ needed to repair the failed VM, next determines whether the remaining Buffer Time is great enough to accommodate the duration of time needed to transfer the failed job to another VM queue (Transition Time $X_t$) and to then complete the job on the new VM complete performance of the failed job (Active Mode Running Time $E_x$). This test may be expressed as the condition:

$$X_t + E_x >= B_t$$

If the system determines in step 225 that there is insufficient Buffer Time to allow the job to be transferred to and performed by another VM, then the system in step 230 transfers the job to a queue of another VM. In sufficient time remains, the VM may be transferred to a VM capable of running in DVFS mode. In such cases, the destination DVFS-capable VM will be run at a level of performance determined by steps similar to those of steps 430-440 of FIG. 4. Such a level may be selected in order to effect an optimal compromised between performance, satisfaction of QoS requirements, and power consumption.

If the system determines in step 225 that there is sufficient Buffer Time to allow the job to be transferred to and performed by another VM, then the system in step 235 pauses the failed queue and attempts in step 235 to repair the failed VM. These repairs may be performed by any means known in the art, and in some embodiments, the repairs may be performed by a method similar to that shown in FIG. 4.

Because the system in step 215 determined that there is insufficient Buffer Time remaining to complete repairs, the VM failure may result in a violation of QoS requirements, such as SLA time (resulting in the failed job being completed at a time later than required by the QoS requirements). In such cases, the system continues to monitor QoS parameters capable of tracking the degree of unavoidable QoS violation created by the failed VM's adverse effect on performance of the failed job.

The system performs step 240 if the system identifies in step 215 a likelihood that the VM can be repaired within the remaining allotted Buffer Time. In such cases, the system, after pausing the failed queue, attempts to repair the failed VM, and then restarts the previously failed jobs in the queue after confirming that the VM has been successfully repaired.

In step 245, the system, having determined in step 215 that the remaining Buffer Time $B_t$ exceeds the duration of Repair Time $R_t$ needed to repair the failed VM, next determines whether the remaining Buffer Time is great enough to accommodate both $R_t$ and the time required to then complete performance of the failed job $E_x$. This test may be expressed as an evaluation of the condition:

$$R_t + E_x >= B_t$$

If the system determines in step 245 that the remaining Buffer Time $B_t$ is insufficient to accommodate the time needed to repair the VM and to then complete the failed job, then the system in step 250 attempts to assign the failed job to another virtual machine. This virtual machine may be running in conventional active mode or may be a VM capable of operating at a custom performance level through DVFS technology.

Figure 3:
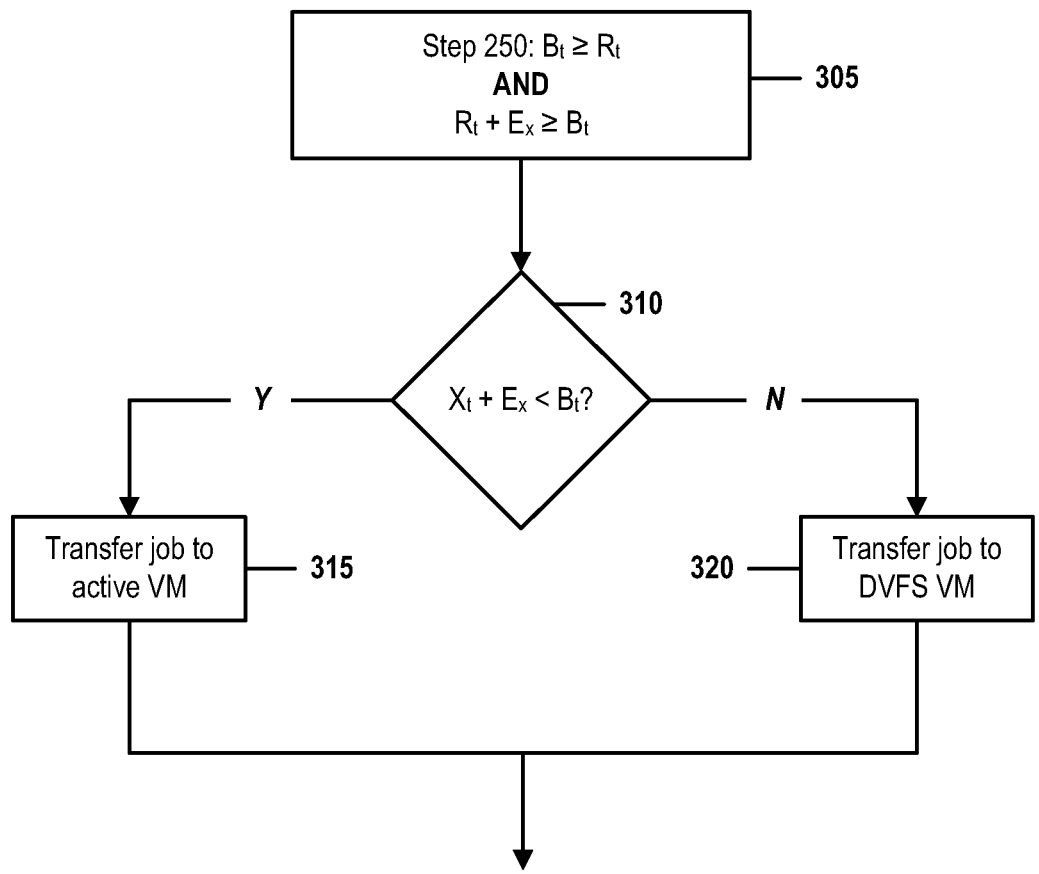
FIG. 3 is a flow chart that illustrates details of a step of attempting to assign a failed job to another VM, in accordance with embodiments of the present invention.

Details of step 250 are described in greater detail in FIG. 3.

If the system determines in step 245 that the remaining Buffer Time $B_t$ is sufficient to accommodate the time needed to repair the failed VM and to then complete the failed job, then the system in step 255 attempts to repair failed VM.

Figure 4:
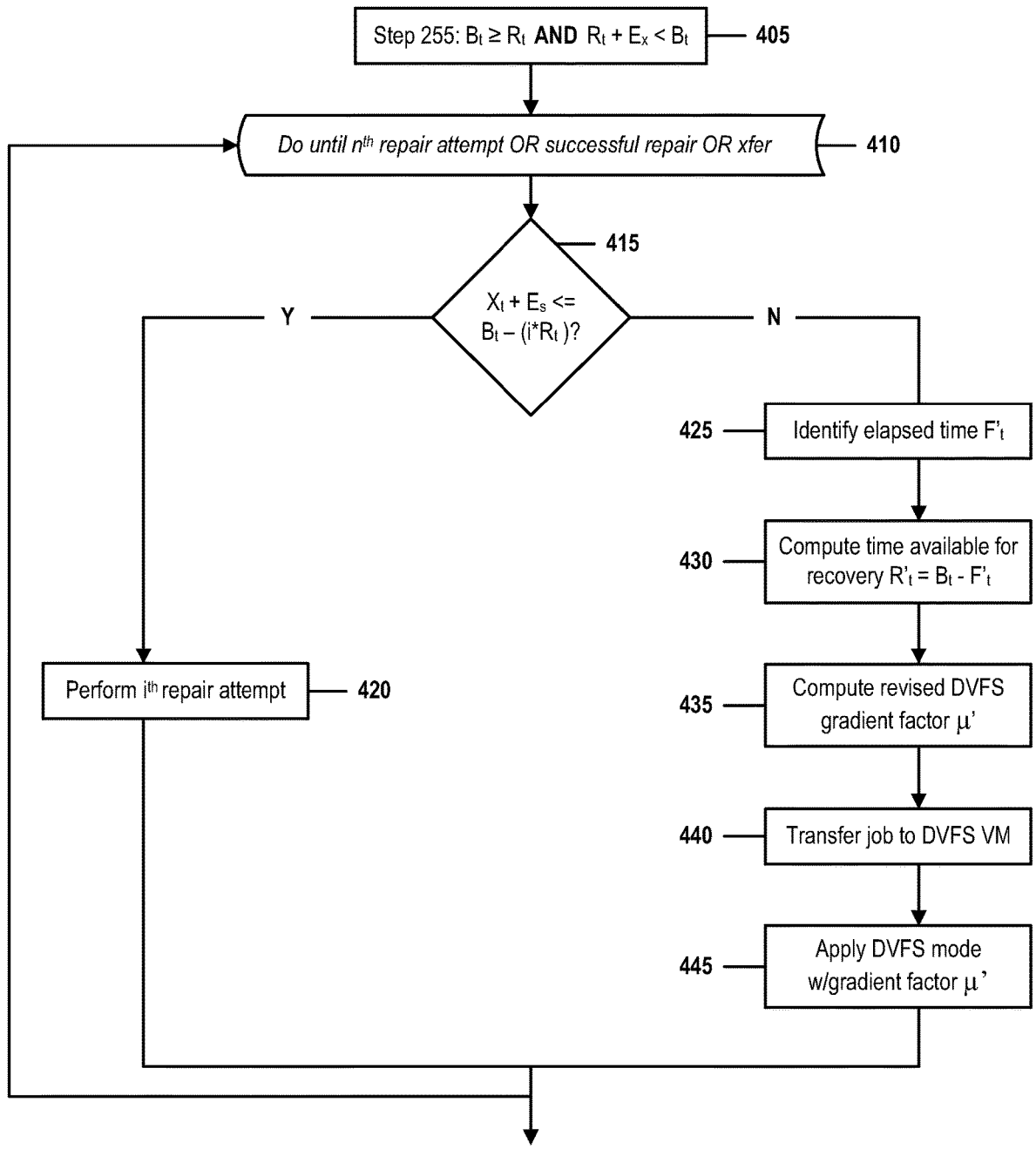
FIG. 4 is a flow chart that illustrates steps of a step of attempting to repair a failed VM, in accordance with embodiments of the present invention.

Details of step 255 are described in greater detail in FIG. 4.

At the conclusion of step 230, 235, 250, or 255, the system will have completed an appropriate response to the system's initial identification of a VM failure, in accordance with embodiments of the present invention. In all for cases, the system will then in step 260 resume monitoring components of the virtualized computing environment in order to detect additional failures. If another failure is detected, the system responds by performing another iteration of the method of FIG. 2.

FIG. 3 is a flow chart that illustrates details of FIG. 2 step 250, which attempts to assign a failed job to another VM. FIG. 3 comprises steps 305-320.

In step 305, the method of FIG. 3 begins when steps 215 and 245 of FIG. 2 have identified a likelihood that the failed VM may be repaired within the remaining allotted Buffer Time (that is, that $B_t \geq R_t$), and have further identified a likelihood that the remaining Buffer Time is insufficient to accommodate both the Repair Time $R_t$ and the Active Mode Running Time $E_x$ (where $E_x$ identifies the additional time required to complete performance of the failed job on the repaired active-mode VM). This latter determination may be expressed as:

$$R_t + E_x \geq B_t$$

In step 310, the system next determines whether the remaining allocated Buffer Time is sufficient to accommodate both the Transition Time $X_t$ required to transfer the failed job to a functioning active-mode VM and the Active Mode Running Time $E_x$ required to then complete performance of the failed job on the active-mode VM. This determination may be expressed as an evaluation of the condition:

$$X_t + E_x < B_t$$

The system performs step 315 if the system in step 310 determines that the remaining allocated Buffer Time is sufficient to transfer the failed job to a functioning VM and to then complete performance of the failed job on the functioning VM.

In this case, the system transfers the failed job to a queue associated with an active-mode VM, allowing the job to be completed normally within the allocated Buffer Time. Because the job is completed before the remaining Buffer Time elapses, this solution does not violate QoS SLA performance requirements associated with the Buffer Time.

The system performs step 320 if the system in step 310 determines that the remaining allocated Buffer Time is insufficient to transfer the failed job to a functioning VM and to then complete performance of the failed job on the functioning VM.

In this case, the system transfers the failed job to a queue associated with VM running on a DVFS-capable platform, such as a DVFS-compliant server. Such a platform may be fine-tuned to allow the DVFS VM greater performance than a conventional active-mode machine (at the cost of higher power consumption) or to provide greater power efficiency at the cost of lower performance. The DVFS-compatible VM may, therefore, provide a most effective compromise between performance and power-efficiency that may minimize a QoS violation that might otherwise occur when transferring the failed VM to a VM provisioned on a conventional active-mode platform.

In some embodiments, the system may determine such a most effective compromise as a function of a DVFS gradient μ that identifies a level of DVFS performance best able to ensure that the remaining allocated Buffer Time $B_t$ is greater than the failed job's DVFS Service Time $E_s$ (an expected length of time necessary for the DVFS-compliant VM to perform the failed job). A method of computing a DVFS gradient is described in FIG. 4.

At the conclusion of step 315 or of step 320, the method of FIG. 3 concludes and the system returns to step 260 of the calling routine of FIG. 2.

FIG. 4 is a flow chart that illustrates details of FIG. 2 step 255, which attempts to repair the failed VM, in accordance with embodiments of the present invention. FIG. 4 comprises steps 405-445.

In step 405, the method of FIG. 4 begins when steps 215 and 245 of FIG. 2 have identified:

i) a likelihood that the failed VM may be repaired within the remaining allotted Buffer Time (that is, that $B_t \geq R_t$), and ii) a likelihood that the remaining Buffer Time is sufficient to accommodate both the Repair Time $R_t$ and the Active Mode Running Time $E_x$ (where $E_x$ identifies additional time needed to perform the failed job on the repaired active-mode VM).

This latter determination may be expressed as:

$$R_t + E_x < B_t$$

Step 410 begins an iterative repair procedure that is performed until:

i) a maximum number of iterations has been performed without successfully repairing the failed VM ii) the failed VM is successfully repaired, or iii) the system determines that it will not be possible to repair the VM within the allotted Buffer Time and transfers the failed job to a different, functioning, VM.

Each iteration of this iterative procedure consists of steps 410-445 of FIG. 4 and each iteration comprises either one attempt to repair the failed VM, or steps to transfer the VM to a functioning VM.

In embodiments and examples described in this document, the iterative procedure may be limited to a maximum of n iterations, where n is a maximum number of allowable repair attempts.

A value of n may be determined by any means known in the art, including by means of methods other than those expressly described by FIG. 4. For example, if each repair attempt requires on average a duration of time that is 10% of the remaining allocated Buffer Time $B_t$, and if the time to perform the failed job on the repaired VM requires 20% of the remaining allocated Buffer Time, then the system might be limited to n=9 iterations in order to ensure that the system does not continue attempting to repair the VM after it is too late to completely perform the job on the repaired VM within the available Buffer Time.

In another example, an implementer might decide to limit the number of repair attempts n to 5, based on an observation that, in the past, a VM that cannot be restored to operation after five attempts is unlikely to be repaired by any further attempted repairs. Such observations may be made by any means known in the art, such as by manually analyzing prior repair records or by allowing the system to automatically retrieve and analyze system log files.

Yet other embodiments may not expressly set a maximum limit of n, instead allowing termination of the iterative procedure of steps 410-445 to be controlled by the conditional of step 415.

Embodiments of the present invention are flexible enough to accommodate these and other known methods of selecting a value of n, as desired by an implementer or as required by technical or business goals and constraints.

In step 415, the system determines whether there is sufficient Buffer Time remaining in order to attempt another repair attempt and, if that next attempt fails, to then transfer the job to another VM and complete performance of that job on the other VM.

Depending on implementation details (as described below), this condition may be expressed as:

$$X_t + E_s <= B_t - (i^*R_t)$$

or as $$X_t + E_x <= B_t - (i^*R_t),$$

where each of i failed repair attempts requires, on average, a duration of time equal to Repair Time $R_t$. The iterative repair procedure of steps 410-445 should therefore halt when Buffer Time $B_t$, as decremented by i instances of Repair Time $R_t$, is no longer sufficient to allow the failed job to be transferred to another functioning VM (a duration equal to Transition Time $X_t$) and to then be completed on that functioning VM (a duration equal to either Active Mode Running Time $E_x$ or to DVFS Service Time $E_s$, depending on embodiment details and on whether the VM to which the job is transferred is running in active mode or has scaled performance by means of DVFS technology).

In some embodiments, DVFS Service Time $E_s$ may be arbitrarily estimated to be equivalent to previously measured Active Mode Running Times $E_x$ for similar jobs running on active-mode VMs. In other embodiments, may be defined, if desired by an implementer, to be an estimated time for an active-mode server to run the failed job, while Service Time $E_s$ may be estimated as an average duration of time required for a DVFS-compliant VM to perform the failed job.

The system performs step 420 after determining in step 415 that sufficient Buffer Time would remain, after performing another repair attempt, to transfer and complete the failed job on another VM. In this case, the system in step 420 performs an $i^{th}$ attempt to repair the VM. If this attempt succeeds, then the failed job is performed in a normal manner by the repaired VM, the iterative procedure of steps 410-445 terminates and the method of FIG. 4 returns control to step 260 of FIG. 2.

If, however, the system in step 415 determines that attempting another repair would, if that repair fails, leave too little remaining Buffer Time to complete the job on another VM, the system continues with steps 425-445, which transfer the failed job to a DVFS VM capable of transferring and completing the job within the remaining allotted Buffer Time (thus satisfying QoS SLA performance commitments).

In some embodiments, when this condition is determined in step 415, an implementer may prefer to retain the option of transferring the failed job to a VM running on an active-mode platform, rather than to a DVFS-compliant server. Such an option might be beneficial in computing environments where it is possible that a DVFS-compliant platform might not be available when needed. In such cases, the system would replace steps 425-445 with a simplified procedure that merely transfers the job to a fully functioning active-mode server. Such embodiments might not provide all the efficiency benefits provided by incorporating DVFS functionality into FIG. 4 or into steps 230 or 250 of FIG. 2.

In step 425, the system identifies a Elapsed Repair Time $F'_t$. This parameter identifies the cumulative amount of time that has elapsed while attempting to repair the failed VM. The system may estimate this value as $(i^*R_t)$, where i repair attempts have been made, each of which were estimated to require a duration of time $R_t$. In other embodiments, the system may set $F'_t$ equal to the actual amount recorded time consumed so far while performing iterations of the methods of FIG. 4.

In step 430, the system computes a Revised Recovery Time $R'_t$, which identifies a duration of time currently still available for repair operations. When identified from the time actually consumed by previous repair efforts, the Revised Recovery Time may be determined to be the amount of remaining Buffer Time $B_t$ left after having spent a duration of time equal to the Elapsed Repair Time $F'_t$ attempting to repair the failed VM:

$$R'_t = B_t - F'_t$$

In step 435, the system computes a revised version of DVFS Gradient Factor μ. As is known in the art, a DVFS Gradient Factors may be used to predict the relative effect on performance of applying a particular degree of DVFS scaling to a DVFS-compliant server or other platform.

Embodiments of the present invention, by methods known in the art, may use such a Gradient Factor to determine a desired degree of DVFS scaling to be applied to a DVFS-compliant server or other platform, such that a VM running on that server or other platform is able to completely perform the failed job without violating QoS SLA performance commitments.

In general, a value of μ may be computed in a standard manner as:

$$\mu = \frac{E_x}{T}$$

where Active Mode Running Time $E_x$ is the estimated duration time required to complete the failed job completed on the VM while the VM is running in active mode (that is, at normal speed, with no DVFS downward scaling), and T is an amount of time during which the failed job may be completely performed without violating a QoS constraint.

A DVFS Gradient Factor μ value that is equal to 1.0 thus identifies a performance goal in which in which the failed job may be completely performed within the duration of time, remaining from the original $B_t$ that is available when the VM begins to perform the job. Embodiments of the present invention compute in step 435 a revised DVFS Gradient Factor μ' that identifies a degree of scaling that should be selected for the DVFS VM that will run the previously failed job at the completion of the method of FIG. 4.

In the method of FIG. 4, the remaining time T available to run the job may be estimated as being equivalent to the Revised Recovery Time $R'_t$ computed in step 430 as:

$$R'_t = B_t - F'_t$$

Revised DVFS gradient μ' may thus be expressed as:

$$\mu' = \frac{E_x}{R'_t}$$

Embodiments may thus scale performance of the DVFS-compliant server such that the VM running on the server performs the previously failed job within the remaining available time, by selecting any DVFS scaling gradient that is greater than or equal to the value of μ'. By applying such a selected gradient value, through means known in the art, when setting a performance level of the DVFS-compliant server, embodiments may ensure that the DVFS-compliant server has a high chance of completing the previously failed job within the remaining available Revised Recovery Time.

In step 440, the system, by means known in the art, transfers the failed job to a fully functioning server or other platform that is capable of supporting DVFS scaling.

In step 445, the system, by means known in the art, sets the scaling gradient for the fully functioning server to a value that is equal to or greater than μ'. The system then allows At the conclusion of the final iteration of the iterative procedure of steps 410-445, the system will have requeued the failed job in the queue of either the original repaired server or of the functioning DVFS server of steps 440-445. The job will then be performed normally.

The method of FIG. 4 then concludes and control is returned to step 260 of FIG. 2.

What is claimed is:

1. A failure-recovery system comprising a processor, a memory coupled to the processor, and a computer-readable hardware storage device coupled to the processor, the storage device containing program code configured to be run by the processor via the memory to implement a method for reprovisioning virtual machines by means of DVFS-aware scheduling, the method comprising:

the system receiving notice that a job has failed due to a failure of a failed virtual machine provisioned on an active-mode physical platform;

the system initially identifying:
  a Buffer Time that specifies a duration of time available for completing performance of the job,
  a Repair Time that specifies an estimated duration of time required to repair the failed virtual machine,
  an Active-Mode Running Time that specifies an estimated duration of time required to perform the failed job on the active-mode physical platform, and
  a Transition Time that specifies an estimated duration of time required to transfer the failed job to a second virtual machine;

the system attempting to transfer the failed job to the second virtual machine if the Buffer Time is less than the Repair time; and the system attempting to repair the failed virtual machine if the Buffer Time is not less than the Repair time.

2. The system of claim 1, where the attempting to reassign further comprises:

the system determining whether the Buffer Time is less than the sum of the Transition Time and the Active-Mode Running Time;

the system transferring the failed job to a queue of a destination DVFS-compliant virtual machine if the Buffer Time is not less than the sum of the Transition Time and the Active-Mode Running Time, where the destination DVFS-compliant virtual machine is provisioned on a DVFS-compliant physical platform that supports dynamic voltage and frequency scaling power-management technology; and the system repairing the failed virtual machine if the Buffer Time is less than the sum of the Transition Time and the Active-Mode Running Time.

3. The system of claim 1, where the attempting to repair further comprises:

the system determining whether the Buffer Time is less than the sum of the Repair Time and the Active-Mode Running Time;

the system transferring the failed job to a queue of a destination working virtual machine if the Buffer Time is not less than the sum of the Repair Time and the Active-Mode Running Time, where the working virtual machine is distinct from the failed virtual machine; and the system initiating an iterative repair effort intended to repair the failed virtual machine if the Buffer Time is less than the sum of the Repair Time and the Active-Mode Running Time.

4. The system of claim 3, where the transferring the failed job further comprises:

the system determining whether the sum of the Active-Mode Running Time and the Transition Time is less than the Buffer Time;

the system selecting a destination active-mode virtual machine to be the destination working virtual machine if the sum of the Active-Mode Running Time and the Transition Time is less than the Buffer Time, where the destination active-mode virtual machine is provisioned on a second physical platform configured to run in active mode; and the system selecting a destination DVFS-compliant virtual machine to be the destination working virtual machine if the sum of the Active-Mode Running Time and the Transition Time is not less than the Buffer Time, where the destination DVFS-compliant virtual machine is provisioned on a DVFS-compliant physical platform that supports dynamic voltage and frequency scaling power-management technology.

5. The system of claim 3, where the initiating an iterative repair effort further comprises:

the system confirming that the sum of the Active-Mode Running Time and the Transition Time is no less than the time remaining from the initially identified Buffer Time;

the system performing an iteration of a repair procedure that attempts to repair the failed virtual machine;

the system subtracting the Repair Time from the remaining Buffer Time; and the system repeating the confirming, the performing an iteration, and the subtracting until either the failed virtual machine has been repaired or until the system determines that the sum of the Active-Mode Running Time and the Transition Time is greater than the time remaining from the initially identified Buffer Time.

6. The system of claim 5, further comprising:

the system determining that the sum of the Active-Mode Running Time and the Transition Time has become greater than the time remaining from the initially identified Buffer Time;

the system identifying the total actual duration of time elapsed while performing the iterations of the repair procedure;

the system computing a Revised Recovery Time $R'_t$ that identifies an actual duration of time currently still available for repair operations, where the Revised Recovery Time is equal to the initially identified Buffer Time less the actual time elapsed since the failed job was originally entered into the queue of jobs;

the system transferring the failed job to a queue of a destination DVFS-compliant virtual machine provisioned on a DVFS-compliant physical platform that supports dynamic voltage and frequency scaling power-management technology;

the system computing a Threshold DVFS Gradient Factor $\mu'$, where the Threshold DVFS Gradient Factor specifies a DVFS performance-scaling factor capable of setting a minimum performance level of the DVFS-compliant physical platform sufficient to complete the failed job within the initially identified Buffer Time; and the system configuring the DVFS-compliant physical platform to a performance level no less than the minimum performance level.

7. The system of claim 1, where the Buffer Time is initially identified as a Sojourn Time of the failed job less the Repair Time, and where the Sojourn Time specifies a total duration of time available to the failed job, beginning from a time when the failed job is first entered into the queue of jobs through the time when the failed job must be completely performed in order to satisfy a previously defined quality-of-service performance requirement.

8. A method for reprovisioning virtual machines by means of DVFS-aware scheduling, the method comprising:

receiving notice that a job has failed due to a failure of a failed virtual machine provisioned on an active-mode physical platform;

initially identifying:
a Buffer Time that specifies a duration of time available for completing performance of the job,
a Repair Time that specifies an estimated duration of time required to repair the failed virtual machine,
an Active-Mode Running Time that specifies an estimated duration of time required to perform the failed job on the active-mode physical platform, and
a Transition Time that specifies an estimated duration of time required to transfer the failed job to a second virtual machine;

attempting to transfer the failed job to the second virtual machine if the Buffer Time is less than the Repair time; and attempting to repair the failed virtual machine if the Buffer Time is not less than the Repair time.

9. The method of claim 8, where the attempting to reassign further comprises:

determining whether the Buffer Time is less than the sum of the Transition Time and the Active-Mode Running Time;

transferring the failed job to a queue of a destination DVFS-compliant virtual machine if the Buffer Time is not less than the sum of the Transition Time and the Active-Mode Running Time, where the destination DVFS-compliant virtual machine is provisioned on a DVFS-compliant physical platform that supports dynamic voltage and frequency scaling power-management technology; and repairing the failed virtual machine if the Buffer Time is less than the sum of the Transition Time and the Active-Mode Running Time.

10. The method of claim 8, where the attempting to repair further comprises:

determining whether the Buffer Time is less than the sum of the Repair Time and the Active-Mode Running Time;

transferring the failed job to a queue of a destination working virtual machine if the Buffer Time is not less than the sum of the Repair Time and the Active-Mode Running Time, where the working virtual machine is distinct from the failed virtual machine; and initiating an iterative repair effort intended to repair the failed virtual machine if the Buffer Time is less than the sum of the Repair Time and the Active-Mode Running Time.

11. The method of claim 10, where the transferring the failed job further comprises:

determining whether the sum of the Active-Mode Running Time and the Transition Time is less than the Buffer Time;

selecting a destination active-mode virtual machine to be the destination working virtual machine if the sum of the Active-Mode Running Time and the Transition Time is less than the Buffer Time, where the destination active-mode virtual machine is provisioned on a second physical platform configured to run in active mode; and selecting a destination DVFS-compliant virtual machine to be the destination working virtual machine if the sum of the Active-Mode Running Time and the Transition Time is not less than the Buffer Time, where the destination DVFS-compliant virtual machine is provisioned on a DVFS-compliant physical platform that supports dynamic voltage and frequency scaling power-management technology.

12. The method of claim 10, where the initiating an iterative repair effort further comprises:
confirming that the sum of the Active-Mode Running Time and the Transition Time is no less than the time remaining from the initially identified Buffer Time;
performing an iteration of a repair procedure that attempts to repair the failed virtual machine;
subtracting the Repair Time from the remaining Buffer Time; and
repeating the confirming, the performing an iteration, and the subtracting until either the failed virtual machine has been repaired or until the system determines that the sum of the Active-Mode Running Time and the Transition Time is greater than the time remaining from the initially identified Buffer Time.

13. The method of claim 12, further comprising:
determining that the sum of the Active-Mode Running Time and the Transition Time has become greater than the time remaining from the initially identified Buffer Time;
identifying the total actual duration of time elapsed while performing the iterations of the repair procedure;
computing a Revised Recovery Time $R'_t$ that identifies an actual duration of time currently still available for repair operations, where the Revised Recovery Time is equal to the initially identified Buffer Time less the actual time elapsed since the failed job was originally entered into the queue of jobs;
transferring the failed job to a queue of a destination DVFS-compliant virtual machine provisioned on a DVFS-compliant physical platform that supports dynamic voltage and frequency scaling power-management technology;
computing a Threshold DVFS Gradient Factor $\mu'$, where the Threshold DVFS Gradient Factor specifies a DVFS performance-scaling factor capable of setting a minimum performance level of the DVFS-compliant physical platform sufficient to complete the failed job within the initially identified Buffer Time; and
configuring the DVFS-compliant physical platform to a performance level no less than the minimum performance level.

14. The method of claim 8, further comprising providing at least one support service for at least one of creating, integrating, hosting, maintaining, and deploying computer-readable program code in the computer system, wherein the computer-readable program code in combination with the computer system is configured to implement the receiving, the initially identifying, the determining, the attempting to reassign, and the attempting to repair.

15. A computer program product, comprising a computer-readable hardware storage device having a computer-readable program code stored therein, the program code configured to be executed by a failure-recovery system comprising a processor, a memory coupled to the processor, and a computer-readable hardware storage device coupled to the processor, the storage device containing program code configured to be run by the processor via the memory to implement a method for reprovisioning virtual machines by means of DVFS-aware scheduling, the method comprising:
the system receiving notice that a job has failed due to a failure of a failed virtual machine provisioned on an active-mode physical platform;
the system initially identifying:
a Buffer Time that specifies a duration of time available for completing performance of the job,
a Repair Time that specifies an estimated duration of time required to repair the failed virtual machine,
an Active-Mode Running Time that specifies an estimated duration of time required to perform the failed job on the active-mode physical platform, and
a Transition Time that specifies an estimated duration of time required to transfer the failed job to a second virtual machine;
the system attempting to transfer the failed job to the second virtual machine if the Buffer Time is less than the Repair time; and
the system attempting to repair the failed virtual machine if the Buffer Time is not less than the Repair time.

16. The computer program product of claim 15, where the attempting to reassign further comprises:
the system determining whether the Buffer Time is less than the sum of the Transition Time and the Active-Mode Running Time;
the system transferring the failed job to a queue of a destination DVFS-compliant virtual machine if the Buffer Time is not less than the sum of the Transition Time and the Active-Mode Running Time, where the destination DVFS-compliant virtual machine is provisioned on a DVFS-compliant physical platform that supports dynamic voltage and frequency scaling power- management technology; and
the system repairing the failed virtual machine if the Buffer Time is less than the sum of the Transition Time and the Active-Mode Running Time.

17. The computer program product of claim 15, where the attempting to repair further comprises:
the system determining whether the Buffer Time is less than the sum of the Repair Time and the Active-Mode Running Time;
the system transferring the failed job to a queue of a destination working virtual machine if the Buffer Time is not less than the sum of the Repair Time and the Active-Mode Running Time, where the working virtual machine is distinct from the failed virtual machine; and
the system initiating an iterative repair effort intended to repair the failed virtual machine if the Buffer Time is less than the sum of the Repair Time and the Active-Mode Running Time.

18. The computer program product of claim 17, where the transferring the failed job further comprises:
the system determining whether the sum of the Active-Mode Running Time and the Transition Time is less than the Buffer Time;
the system selecting a destination active-mode virtual machine to be the destination working virtual machine if the sum of the Active-Mode Running Time and the Transition Time is less than the Buffer Time, where the destination active-mode virtual machine is provisioned on a second physical platform configured to run in active mode; and
the system selecting a destination DVFS-compliant virtual machine to be the destination working virtual machine if the sum of the Active-Mode Running Time and the Transition Time is not less than the Buffer Time, where the destination DVFS-compliant virtual machine is provisioned on a DVFS-compliant physical platform that supports dynamic voltage and frequency scaling power-management technology.

19. The computer program product of claim 17, where the initiating an iterative repair effort further comprises:

the system confirming that the sum of the Active-Mode Running Time and the Transition Time is no less than the time remaining from the initially identified Buffer Time;

the system performing an iteration of a repair procedure that attempts to repair the failed virtual machine;

the system subtracting the Repair Time from the remaining Buffer Time; and the system repeating the confirming, the performing an iteration, and the subtracting until either the failed virtual machine has been repaired or until the system determines that the sum of the Active-Mode Running Time and the Transition Time is greater than the time remaining from the initially identified Buffer Time.

20. The computer program product of claim 19, further comprising:

the system determining that the sum of the Active-Mode Running Time and the Transition Time has become greater than the time remaining from the initially identified Buffer Time;

the system identifying the total actual duration of time elapsed while performing the iterations of the repair procedure;

the system computing a Revised Recovery Time $R'_t$ that identifies an actual duration of time currently still available for repair operations, where the Revised Recovery Time is equal to the initially identified Buffer Time less the actual time elapsed since the failed job was originally entered into the queue of jobs;

the system transferring the failed job to a queue of a destination DVFS-compliant virtual machine provisioned on a DVFS-compliant physical platform that supports dynamic voltage and frequency scaling power-management technology;

the system computing a Threshold DVFS Gradient Factor $\mu'$, where the Threshold DVFS Gradient Factor specifies a DVFS performance-scaling factor capable of setting a minimum performance level of the DVFS-compliant physical platform sufficient to complete the failed job within the initially identified Buffer Time; and the system configuring the DVFS-compliant physical platform to a performance level no less than the minimum performance level.

\* \* \* \* \*

UNITED STATES PATENT AND TRADEMARK OFFICE
CERTIFICATE OF CORRECTION

PATENT NO. : 11,416,322 B2
APPLICATION NO. : 16/409094
DATED : August 16, 2022
INVENTOR(S) : Rajesh Kumar Saxena and Vikram Yadav It is certified that error appears in the above-identified patent and that said Letters Patent is hereby corrected as shown below:

On the Title Page

(72) Inventors: should read as follows:
Rajesh Kumar Saxena, Thane East (IN);
Vikram Yadav, Bangkok (TH)

Signed and Sealed this
Twenty-sixth Day of November, 2024

Katherine Kelly Vidal
*Director of the United States Patent and Trademark Office*